Dec. 4, 1951 G. C. SULLIVAN 2,577,287
CARGO AIRCRAFT
Filed July 12, 1943 2 SHEETS—SHEET 1
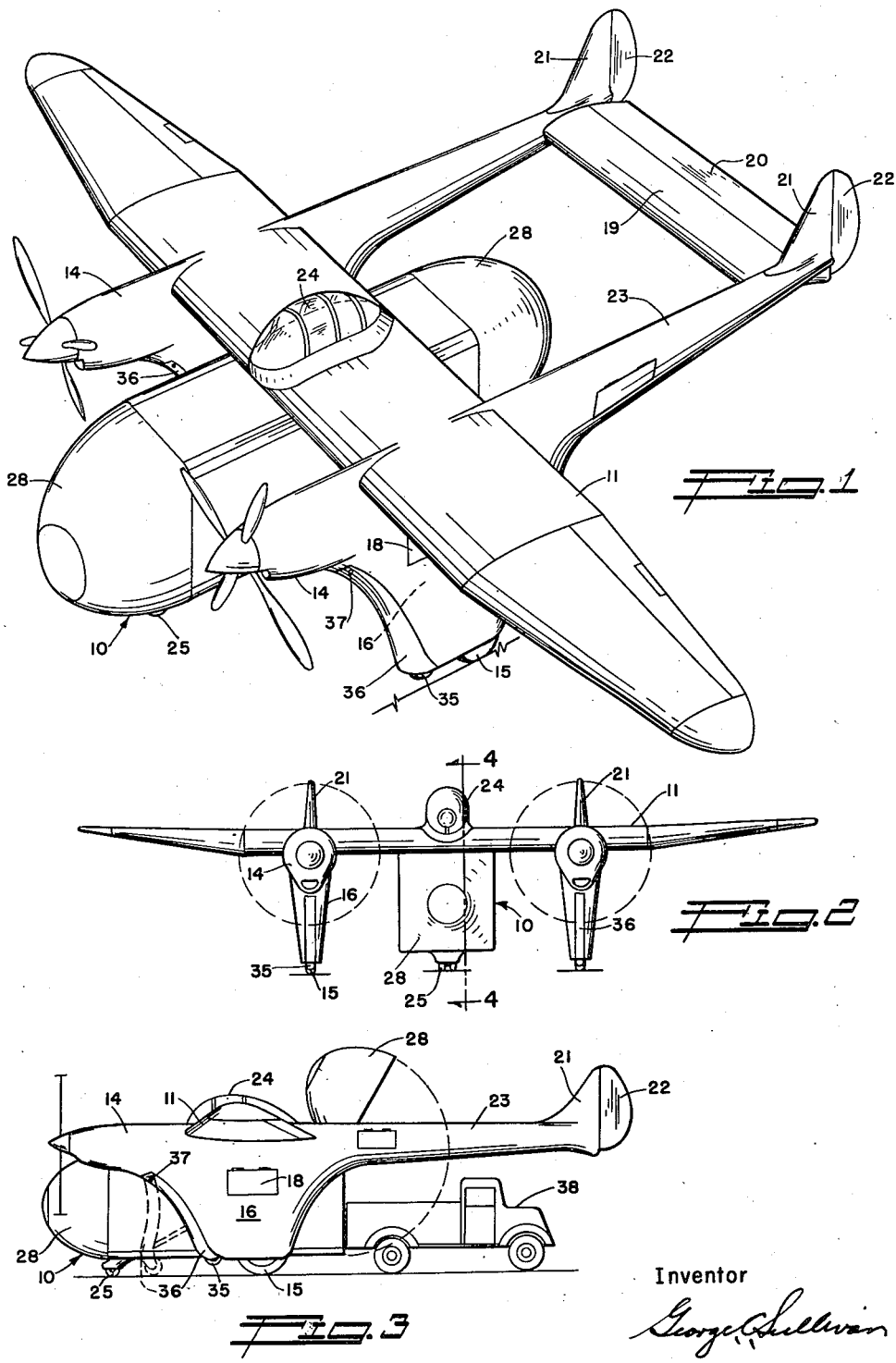
Inventor
George C. Sullivan

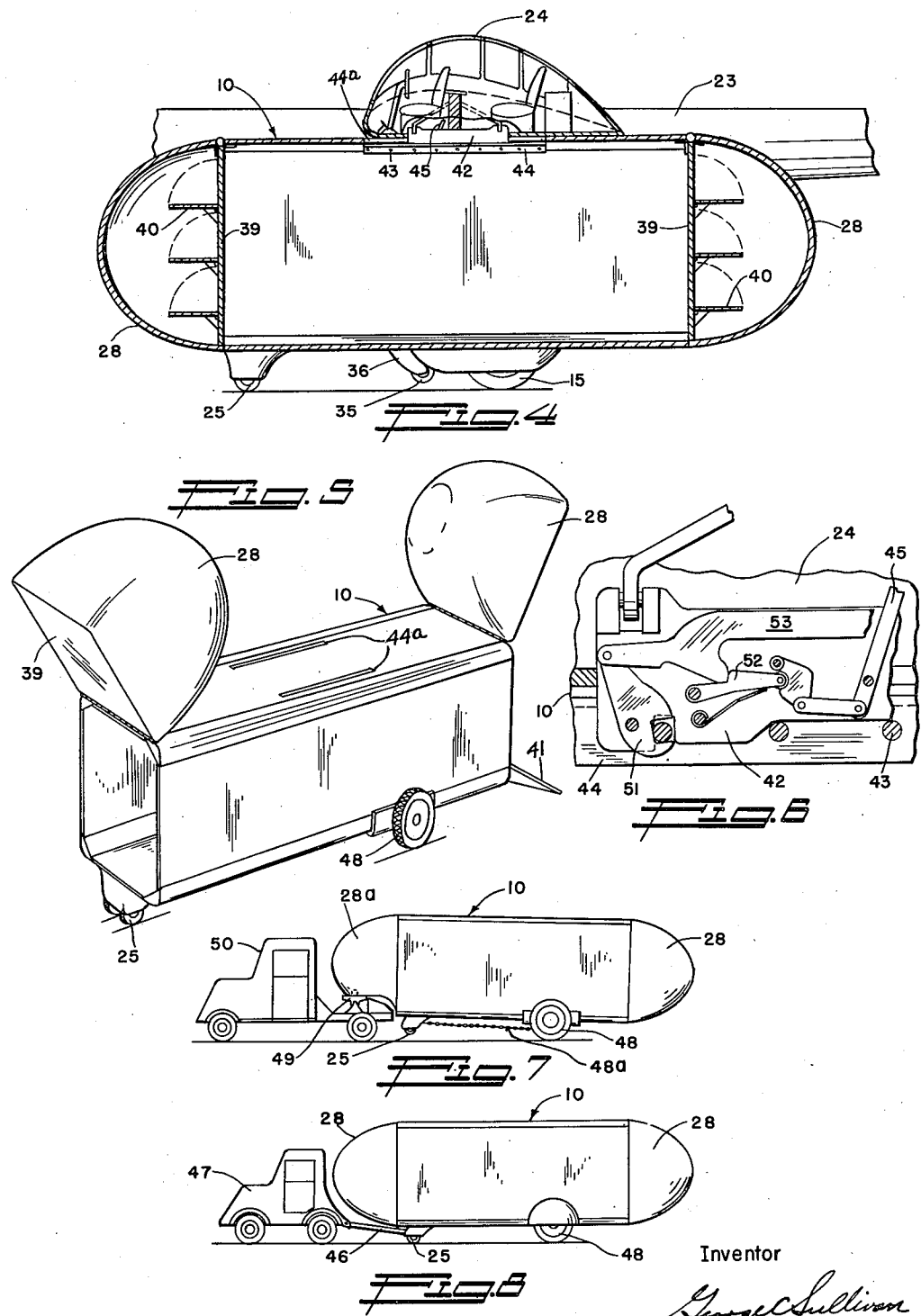

Patented Dec. 4, 1951

2,577,287

UNITED STATES PATENT OFFICE 2,577,287

CARGO AIRCRAFT

George C. Sullivan, Hollywood, Calif., assignor to Lockheed Aircraft Corporation, Burbank, Calif.

Application July 12, 1943, Serial No. 494,269

11 Claims. (Cl. 244—118)

This invention relates to new and useful improvements in the design and construction of cargo carrying airplanes, and is related to the subject matter of my copending application Serial Number 331,805 filed April 26, 1940, now Patent #2,367,538, issued January 16, 1945, wherein I disclose a cargo airplane of the general type involved herein. The present invention distinguishes thereover in providing a detachable cargo compartment or container, leaving the airplane itself free for ground movement without the compartment, or with another and preloaded compartment, of which a number may be provided for interchangeable use with one or more self-contained airplanes or "flying wings." A further advantage is that the basic aircraft unit may be designed so that it is flyable without the cargo compartment.

The design of an airplane primarily for cargo transportation involves a new and novel approach as distinguished from general purpose airplanes intended for the concurrent transportation of passengers, mail and express, as such all-purpose airplanes subordinate the mail and express cargo to the passenger space, and therefore store such material in various otherwise unusable spaces chiefly characterized by their inaccessibility and the necessarily awkward handling of such cargo, involving a careful division of the weight between the several compartments, and a resulting delay to the passengers at the terminals and intermediate fields.

It is accordingly an object of this invention to provide an improved and simplified cargo type airplane wherein the cargo compartment is detachable to facilitate interchange and preloading of compartments, and in which the airplane itself is airworthy and groundworthy with or without a cargo compartment attached thereto. With such an arrangement an airplane can be utilized to the maximum by providing a series of compartments to be loaded and unloaded at either end of the usual run or at intermediate stops while the airplane continues in transit with a loaded cargo compartment. For example, a single airplane could keep at least three compartments in service, one in the air while two were being loaded and unloaded at the respective terminals. A further feature of advantage is to arrange the compartments as roadable trailers or semi-trailers adapting them to factory and store door delivery at either terminal, in which case various sizes of compartments could be provided for interchangeable use with the airplane, and such compartments could be further specialized according to the weight and/or bulk and/or character of the usual shipments from a given source, such for example as dry or wet bulk materials, refrigerated foods, machinery, vehicles and the like; regular shippers being provided with specialized compartments or containers best suited to the products they normally handle, while extraordinarily large or bulky units might be directly substituted for the cargo compartment.

Since the center of gravity of a loaded airplane must be held to close limits relative to the aerodynamic center of lift, the normal practice is to carefully distribute and apportion the load. Such a practice may be found difficult to accomplish if a variety of containers were to be randomly loaded at remote points by unskilled personnel and then delivered to an airport for attachment to the airplane, so that it is a further object of this invention to provide adjustable means to balance the loaded cargo compartment relative to the airplane. One means by which this can be accomplished is to provide one or more standard releasable shackles as now used for the mounting of bombs on military aircraft, such shackles to be used for supporting the cargo compartment, and to provide a series of engagement points on the compartment whereby it can be balanced beneath the shackle by shifting either the airplane or the compartment longitudinally, one relative to the other, until the center of gravity of the compartment is in a position which will permit the aircraft to be flown successfully with good longitudinal control. Engagement of the shackle between the airplane or "flying wing" and the compartment requires that either the compartment be hoisted into engagement with the shackle; as by means of a conventional bomb hoist, or a service station type of car lift; or that the airplane or "flying wing" be lowered into contact with the compartment, as by collapsing the usual hydraulic and/or pneumatic shock absorbing struts associated with the airplane landing gear, subsequently refilling or reinflating the struts to lift the airplane and cargo compartment into taxiing trim.

It is also an object of this invention to provide cooperating and separable airplane and cargo compartments wherein the airplane forms a unit which is entirely self contained and capable of operation alone while taxiing on the ground and preferably, capable of operation alone in the air and so arranged that the various electric, hydraulic, and/or cable operating connections are entirely self contained in the airplane itself, and therefore protected from the damage that inevitably accompanies cargo handling, especially in the light weight structure so necessary for aircraft components. Since the airplane is self contained and aerodynamically balanced with or without the cargo compartment, the latter could be released in an emergency to enable the airplane and its crew to avoid an imminent crash, since the release of so much weight would permit rapid maneuvering which might be impossible with a fully loaded airplane.

Other and further important objects of this invention will be apparent from the disclosures in the specification and the accompanying drawings.

This invention in its preferred form is illustrated in the drawings and hereinafter more fully described.

On the drawings—

Figure 1 is a perspective view of an assembled airplane and cargo compartment chosen as an illustrative embodiment of the features of this invention.

Figure 2 is a front elevation thereof.

Figure 3 is a side elevation showing the cargo compartment in loading position while attached to the airplane.

Figure 4 is a central longitudinal section, taken on the line 4—4 of Figure 2, to show the operating compartment in the wing, and the arrangement for suspending the cargo compartment from the wing for release therefrom.

Figure 5 is a perspective view of the cargo compartment with its ends opened for loading, the rear bulkhead being shown as arranged for use as a loading ramp.

Figure 6 is a fragmentary enlarged detail of one hook of a conventional shackle release mechanism.

Figure 7 shows the cargo compartment arranged as a semi-trailer; and Figure 8 shows the compartment towed as a full trailer, using the nose wheel thereof as a steerable road wheel; separable trailer or dolly wheels being provided for the rear of the compartment in each case.

As shown on the drawings—

I have chosen to illustrate my present invention as an improvement over that disclosed in my copending application Serial No. 331,805, previously mentioned, wherein a central cargo compartment was supported beneath a wing, and between twin power plant nacelles, which terminated in twin tail booms supporting the empennage. The present invention also utilizes a wing 11, power plant units or nacelles 14, tail booms 23 supporting an empennage comprising rudders 22, vertical stabilizers 21, a horizontal stabilizer 19 and an elevator 20, all substantially corresponding to those shown in my previous application. Similar main leading wheels 15 are also shown which have housings that may also be used for cargo space 16 as before. Obviously, the main wheels 15 can be retractable if such would be desirable in any particular design.

The present invention departs from that of my prior application in that the cargo compartment, to be later described, is detachable from, and adjustably positionable relative to, the wing, and a pilot's or control cockpit 24 is built into the basic airplane, that is, separated from the cargo compartment, in this case such cockpit is preferably built into and on top of the wing, all necessary operating and functional controls being carried through the wing to the engines and control surfaces. Thus the airplane becomes in effect a separate and self-contained unit, flyable and/or movable with or without the cargo compartment. In order to enable it to land and taxi by itself, auxiliary landing wheels 35 are arranged in advance of the main wheels 15 and are carried in pivoted supports 36 faired into the leading edge of the main wheel housing. A pivot 37 for the support is arranged ahead of and considerably above the retracted position of the auxiliary wheel so that the wheel 35 is swung down into contact with the ground when in operating condition, yet is retracted so as not to interfere with the operation of the main wheels when operating in connection with a pivoted nose wheel 25 carried by the cargo compartment to be now described. The auxiliary wheels may be designed in such a manner that they may be used in normal operation, thus making the airplane landing gear consist of possibly four landing wheels similar to the present automobile or the like. In this case the nose wheel, if any, is not relied upon for ground service.

A cargo compartment, designated generally by the numeral 10, may be of any convenient shape, although I prefer a generally box-like section because of the increased availability and ease of stowage of miscellaneous packages, crates, or boxes therein. Such a box-like or rectangular section is preferably carried unchanged through the length of the compartment, the ends being closed by streamlined fairings 28, which may conveniently be hinged to the top of the compartment in order to be out of the way while loading and to facilitate backing a truck 38 up to either the front, or the back of the compartment as shown in Figure 3, for loading or unloading. In order to make use of these streamlined fairings for further stowage, bulkheads 39, with folding shelves 40, may also be hinged to the ends of the compartment, and if so desired one or both bulkheads may be hinged to swing down, as shown at 41 in Figure 5, to form a loading ramp. While the compartment could be loaded while attached to the airplane and then shifted for balance relative thereto, such a proceeding would tie up the airplane during the loading operation and therefore is contemplated only in an emergency. In the event the cargo needs temperature regulation, such as may be required in the transportation of certain perishable material, suitable heating and/or cooling equipment (not shown) may be installed in the streamlined fairings.

The cargo compartment is intended to be releasably and adjustably suspended beneath the wing 11. One convenient method is to use one or more standard bomb shackles 42, preferably attached to the main wing beam near the aerodynamic center of lift of the aircraft or adjacent a vertical plane passing through said aerodynamic center of lift, two being used in the illustrated embodiment to each selectively engage any of several aligned pairs of pins 43 carried by brackets 44 secured to the inner side of the top of the compartment, a suitable elongated slot 44a in the top of the compartment being provided to permit entrance of the shackle body. Two slots 44a are shown in Figure 5 and these slots are located medially of the length of the box-like portion of the cargo compartment 10. The slots 44a are substantially greater in length than the length of the shackles 42 which are adapted to extend thereinto, as will be evident from Figure 4. The relative length of the slots 44a with respect to the length of the cargo compartment 10 and with respect to the length of the shackles 42 is such that the center of gravity of the compartment when loaded with miscellaneous cargo can be located a reasonable distance either forwardly or rearwardly of a vertical plane passing through the center of gravity of the cargo compartment when empty, or through the geometrical center of said compartment, and still permit the cargo compartment to be attached to the wing 11 with its center of gravity substantially vertically aligned with the aerodynamic center of lift of the airplane.

Since various sizes and shapes of compartments, or even bulky objects such as tanks, vehicles, or machinery may be hung from such shackles, they are balanced relative to the aerodynamic center of the airplane, and are attached to selected pairs of pins 43 to suspend the cargo compartment in balance therebeneath. Since the balance of the compartment will vary according to its loading, a number of pairs of pins 43 are provided arranged in a line extending lengthwise of the compartment and in a zone extending both forwardly and rearwardly of a vertical plane passing through the center of gravity of a compartment when empty so that the compartment when carrying an unbalanced load can be shifted longitudinally until its balance point or center of gravity approximately agrees with or is substantially aligned with a vertical plane passing through the aerodynamic center of lift of the airplane. The balance point of the loaded cargo compartment can easily be determined during the usual process of weighing the loaded compartment, since the loaded weight is necessary in any case.

Such standard bomb shackles 42 are provided with either or both an electrical and manual release, the latter being indicated at 45 in Figure 4, being located in positions convenient to the pilot, so that he can release the compartment at will, and even in flight if necessary to avoid an imminent crash. A fragmentary detail of a conventional shackle is shown in Figure 6, where one hook 51 of the shackle is shown as held engaged with a selected pin 43 by means of a trigger 52 holding a bar 53 which is also linked to the second hook (not shown) of the shackle. Movement of the manual release lever 45 releases the end of the trigger 52 and allows the weight of this compartment to swing the hook 51 clockwise to release the pin 43 therefrom. The engagement between the shackle hooks and the pins is automatic upon juxtaposition thereof, and operation of the release lever 45 simultaneously unlatches both hooks of the shackle.

The detachable cargo compartments may conveniently be converted into semi or full trailers for road delivery from the terminal to the store or plant for loading and unloading at the points of initiation and destination of a shipment. The pivoted nose wheel 25, under the front of the compartment, can be coupled by a tow bar 46 to a tractor 47, suitable rear wheels being mounted on the compartment as shown in Figure 8, or arranged as a wheeled truck or dolly 48 which can be placed under and towards the rear of the compartment 10. If a removable dolly is used a tongue or safety chain 48a may be used to retain the dolly in place. On the other hand, a front end closure 28a could be arranged to couple into a fifth wheel 49 on a tractor 50 to form a tractor-semi-trailer combination as in Figure 7, in which case the nose wheel 25 might be retracted. The closure 28a can be streamlined in flight by a quickly applied and disconnected fairing (not shown).

In the normal operation of the airplane and separable cargo compartment of this invention, the cargo compartment will be preloaded either at a loading dock at the airport, or at the shipper's plant, and then towed to the airport. When ready to connect to the airplane either the compartment or the airplane is maneuvered or taxied into engagement position, the center of gravity having been indicated on the compartment. When in proper alignment the compartment is either hoisted to engage the shackles 42 with the proper pins 43, or the airplane is lowered, as by deflating the landing gear, to engage the shackles. Other means may also be used to accomplish this result. In any case, the normal position of the cargo compartment when the airplane is in taxiing trim, is high enough to disengage the truck or dolly 48, which can be rolled out from under the compartment. The auxiliary landing wheels are then retracted, utilizing the main and nose wheels for take-off and landing of the composite aircraft. Upon arrival and landing at the destination the cargo compartment is either lowered on to a dolly if for road delivery, or on to a suitable rear support at the air terminal, if to be unloaded without further movement.

While I have chosen a specific embodiment of my invention for illustrative purposes, it is to be understood that my invention is not limited thereto but that many changes and variations in the arrangement and structural features may be made in the herein disclosed embodiment without departing from the spirit of the invention or the scope of the appended claims.

I claim as my invention:

1. In combination: an airplane; a detachable cargo compartment; means detachably connecting said cargo compartment to said airplane; and a tricycle landing gear comprising main landing wheels secured to said airplane and a pivoted nose wheel carried by said cargo compartment forwardly of said main landing wheels.

2. In an airplane and a detachable cargo compartment combination wherein the airplane is self contained and maneuverable with or without the cargo compartment, means detachably securing said cargo compartment to said airplane with the center of gravity of said cargo compartment in substantially vertical alignment with the aerodynamic center of lift of said airplane; a tricycle landing gear for the combination including main wheels associated with and carried by said airplane and a nose wheel carried by the cargo compartment forwardly of said main wheels; and auxiliary landing wheels carried by said airplane forwardly of the main landing wheels of said airplane, said auxiliary landing wheels being extendable into ground engagement for use in taxiing when said cargo compartment with its associated nose wheel of the tricycle landing gear is detached from said airplane.

3. In an airplane and detachable cargo compartment combination, wherein the airplane is self contained and flyable with or without the cargo compartment, means for attaching said cargo compartment to the airplane with the center of gravity of said cargo compartment in substantially vertical alignment with the aerodynamic center of lift of said airplane; landing gear for said combination including wheel means on both said airplane and cargo compartment serving as landing wheels; and auxiliary wheel means operatively associated with the airplane and the cargo compartment, respectively, cooperable with said landing wheels to provide independent taxiing of the airplane and roadability of the cargo compartment when said cargo compartment is detached from said airplane.

4. A detachable cargo compartment, for use with an airplane of the high wing type having depending struts and a landing wheel associated with each strut and wherein said cargo compartment is adapted to be suspended from said wing at a point between said struts, comprising: an elongated hollow body providing space for cargo and having an access door mounted thereon; a wheel secured to said body at the forward end thereof adapted to serve as a nose wheel and to cooperate with the aforementioned landing wheels to provide a tricycle landing gear for said airplane; and road wheels at the rear end of said body for rendering said cargo compartment roadable upon detachment from said airplane.

5. A detachable cargo compartment for use with an airplane having releasable shackle means for securing a cargo compartment thereto, comprising: an elongated hollow body having at least one elongated, longitudinally extending slot formed therein and adapted to receive the releasable shackle means carried by said airplane, a plurality of spaced fastening elements carried by said body, said fastening elements being accessible through said slot and selectively connectable with said releasable shackle means, said slot being substantially greater in length than said shackle means whereby to permit securing of said cargo compartment to said airplane in any one of a plurality of positions of longitudinal adjustment of said cargo compartment relative to said airplane.

6. A detachable cargo compartment, for use with an airplane of the high wing type having depending struts and a landing wheel associated with each strut and wherein said cargo compartment is adapted to be suspended from said wing at a point between said struts, comprising: an elongated hollow body providing space for cargo and having an access door mounted thereon; and a wheel secured to said body at the forward end thereof adapted to serve as a nose wheel and to cooperate with the aforementioned landing wheels to provide a tricycle landing gear for said airplane, said body being adapted to have dolly wheels associated therewith upon detachment from said airplane to render the cargo compartment roadable.

7. A detachable cargo compartment as defined in claim 5 in which the fastening elements are pins extending transversely across the slot.

8. In combination: an airplane of the high wing type having engine nacelles and tail support booms forming continuations of said nacelles, a detachable cargo compartment centrally located below said wing and between said nacelles and booms, means detachably connecting said cargo compartment to said airplane, said means securing said cargo compartment to said airplane with the center of gravity of said compartment in substantially vertical alignment with the aerodynamic center of lift of said airplane, and a four-wheel landing gear comprising two wheels aligned with each of said tail support booms, means depending from said nacelles and tail support booms and carrying said wheels, the two wheels aligned with each of said tail support booms being spaced apart longitudinally a distance sufficient to enable the four-wheel landing gear to serve both as a landing means for the airplane and as a support for the airplane when said airplane is on the ground, said wheels being further arranged so that said detachable cargo compartment will be positioned in a substantially level attitude and substantially parallel with the ground when said airplane is on the ground.

9. In an airplane and detachable cargo compartment combination wherein the airplane is self-contained and flyable with or without the cargo compartment; means for attaching said cargo compartment to the airplane with the center of gravity of said cargo compartment in substantially vertical alignment with the aerodynamic center of lift of said airplane; a landing gear for said combination including a wheel on said cargo compartment and a pair of wheels on said airplane arranged on opposite sides of said cargo compartment and disposed rearwardly of the wheel on said cargo compartment, said landing wheels being disposed in a common horizontal plane and arranged to support said cargo compartment in a substantially horizontal attitude when said airplane is on the ground; auxiliary wheel means on said airplane cooperable with said pair of landing wheels to permit independent taxiing of the airplane; and auxiliary wheels on said cargo compartment cooperable with said wheel on said cargo compartment to permit roadability of the cargo compartment when said cargo compartment is detached from said airplane.

10. In combination: an airplane of the high-wing type having engine nacelles and tail support booms forming continuations of said nacelles; a detachable cargo compartment centrally located below said wing and between said nacelles and tail support booms; means detachably connecting said cargo compartment to said airplane, said means securing said cargo compartment to said airplane with the center of gravity of said compartment in substantially vertical alignment with the aerodynamic center of lift of said airplane; and a four-wheel landing gear for said airplane comprising two wheels in a horizontal plane below but aligned with each of said tail support booms, housing means extending downwardly from each nacelle and tail support boom and having one of said wheels mounted therein in a fixed position relative thereto, and retractible means forming part of said housing means and supporting the other of said wheels, the two wheels aligned with each of said tail support booms being arranged and spaced apart a distance longitudinally, when said other wheels are advanced, sufficient to enable the four-wheel landing gear to serve both as a landing means for the airplane and as a support for the airplane when said airplane is on the ground, all of said wheels when in landing position being disposed in a common horizontal plane so that said detachable cargo compartment will be positioned in a substantially level attitude and substantially parallel with the ground when said airplane is on the ground.

11. In an airplane and detachable cargo compartment combination: means for attaching said cargo compartment to said airplane with the center of gravity of said cargo compartment in substantially vertical alignment with the aerodynamic center of lift of said airplane; a main landing gear for said combination of airplane and cargo compartment, said landing gear being disposed in a common horizontal plane and arranged to support said cargo compartment in a substantially horizontal attitude when said airplane is on the ground; and auxiliary wheel means associated with said combination of airplane and cargo compartment cooperable with said landing gear to provide independent taxiing of the airplane and independent roadability of the cargo compartment when said cargo compartment is detached from said airplane.

GEORGE C. SULLIVAN.

REFERENCES CITED

The following references are of record in the file of this patent:

UNITED STATES PATENTS

| Number | Name | Date |
|---|---|---|
| 1,008,437 | Seelig | Nov. 14, 1911 |
| 1,325,230 | Caproni | Dec. 16, 1919 |
| 1,374,150 | Johnson | Apr. 5, 1921 |
| 1,480,582 | Weed | Jan. 15, 1924 |
| 1,713,069 | Barnhardt | May 14, 1929 |
| 1,716,439 | Gray | June 11, 1929 |
| 1,771,053 | Martin | July 22, 1930 |
| 1,797,326 | Christmas | Mar. 24, 1931 |
| 1,797,713 | Brogelli | Mar. 24, 1931 |
| 1,916,092 | Bleriot | June 27, 1933 |
| 1,992,941 | Fowler | Mar. 5, 1935 |
| 2,075,042 | Knerr | Mar. 30, 1937 |
| 2,315,117 | Freytag | Mar. 30, 1943 |
| 2,323,279 | Van Zelm | June 29, 1943 |

FOREIGN PATENTS

| Number | Country | Date |
|---|---|---|
| 139,295 | Great Britain | Mar. 4, 1920 |